(12) United States Patent
Lorenz

(10) Patent No.: US 11,046,419 B2
(45) Date of Patent: Jun. 29, 2021

(54) AERODYNAMIC SEALING AND WING FOR AN AIRCRAFT COMPRISING SUCH SEALING

(71) Applicant: Airbus Operations GmbH, Hamburg (DE)

(72) Inventor: Florian Lorenz, Hamburg (DE)

(73) Assignee: Airbus Operations GmbH

( * ) Notice: Subject to any disclaimer, the term of this patent is extended or adjusted under 35 U.S.C. 154(b) by 481 days.

(21) Appl. No.: 15/968,850

(22) Filed: May 2, 2018

(65) Prior Publication Data
US 2018/0319480 A1 Nov. 8, 2018

(30) Foreign Application Priority Data

May 2, 2017 (DE) .................... 10 2017 109 368.0

(51) Int. Cl.
| | | |
|---|---|---|
| *B64C 7/00* | (2006.01) | |
| *B64C 9/16* | (2006.01) | |
| *B64C 9/02* | (2006.01) | |
| *F16J 15/10* | (2006.01) | |
| *B64C 9/22* | (2006.01) | |
| *F16J 15/02* | (2006.01) | |

(52) U.S. Cl.
CPC .................. *B64C 7/00* (2013.01); *B64C 9/02* (2013.01); *B64C 9/16* (2013.01); *B64C 9/22* (2013.01); *F16J 15/024* (2013.01); *F16J 15/104* (2013.01)

(58) Field of Classification Search
CPC ............................... F16J 15/024; F16J 15/027
See application file for complete search history.

(56) References Cited

U.S. PATENT DOCUMENTS

| | | | | |
|---|---|---|---|---|
| 3,732,788 A | * | 5/1973 | Brown ................... | E01C 11/106 404/64 |
| 3,743,219 A | | 7/1973 | Gorges | |
| 3,899,260 A | * | 8/1975 | Kerschner ............. | E01C 11/106 404/64 |
| 3,917,194 A | * | 11/1975 | Muller ...................... | B64C 3/40 244/46 |

(Continued)

FOREIGN PATENT DOCUMENTS

| | | |
|---|---|---|
| DE | 10 2005 013005 A1 | 9/2006 |
| EP | 0 538 963 A1 | 4/1993 |

(Continued)

*Primary Examiner* — Richard G Davis
(74) *Attorney, Agent, or Firm* — Lerner, David, Littenberg, Krumholz & Mentlik, LLP

(57) ABSTRACT

An aerodynamic sealing includes: an elastic first sealing wall extending between a first bottom edge and a first tip edge; an elastic second sealing wall extending between a second bottom edge and a second tip edge, and extending convergent with respect to the first sealing wall, so that the first and second sealing walls are joined together at their first and second tip edges to form a tip line; a bottom element connecting the first bottom edge to the second bottom edge, wherein the bottom element is joined to both the first sealing wall and the second sealing wall; and a plurality of stiffening elements connecting the first sealing wall to the second sealing wall between the tip line and the bottom element, wherein the stiffening elements are spaced apart from one another and joined to both the first sealing wall and the second sealing wall.

14 Claims, 4 Drawing Sheets

(56) References Cited

U.S. PATENT DOCUMENTS

| | | | |
|---|---|---|---|
| 4,042,191 A * | 8/1977 | Johnson | B64C 9/24 |
| | | | 244/214 |
| 5,158,252 A * | 10/1992 | Sakurai | B64C 3/48 |
| | | | 244/213 |
| 2006/0186269 A1* | 8/2006 | Kota | B63B 39/06 |
| | | | 244/123.1 |
| 2009/0072093 A1* | 3/2009 | Fox | B64C 9/22 |
| | | | 244/214 |
| 2010/0133760 A1 | 6/2010 | Martinez Valdegrama et al. | |
| 2011/0133411 A1* | 6/2011 | Wildman | B64C 9/02 |
| | | | 277/345 |

FOREIGN PATENT DOCUMENTS

| | | |
|---|---|---|
| EP | 2 266 877 A2 | 12/2010 |
| GB | 2 003 098 A | 3/1979 |
| WO | 2004/108525 A1 | 12/2004 |
| WO | 2010/023475 A2 | 3/2010 |

* cited by examiner

AERODYNAMIC SEALING AND WING FOR AN AIRCRAFT COMPRISING SUCH SEALING

FIELD OF THE INVENTION

The present invention relates to an aerodynamic sealing. Further aspects of the invention relate to a wing for an aircraft comprising such an aerodynamic sealing.

BACKGROUND OF THE INVENTION

Various aerodynamic types of sealing are known in the art, often made of an elastic solid material and arranged within a gap in the aerodynamic outer surface e.g. of an aircraft component. Ideally, the aerodynamic sealing seals the gap such that a) no airflow is permitted through the gap and b) the aerodynamic sealing forms a smooth transition between the aerodynamic outer surfaces on both sides of the gap, so that the external flow along the aerodynamic outer surface is not negatively affected. However, fulfilling these requirements is not always possible or at least complicated. An example would be a gap between a main wing of an aircraft and a flap movably mounted to the main wing, where a tight sealing of the gap is required in a retracted position of the flap.

BRIEF SUMMARY OF THE INVENTION

Thus, an aspect of the present invention may provide a simple and universal aerodynamic sealing that is capable of tightly sealing a gap in an aerodynamic surface without negatively affecting an external flow along the aerodynamic outer surface.

An embodiment of the invention includes an aerodynamic sealing comprising a first sealing wall, a second sealing wall, a bottom element, and a plurality of stiffening elements. The first sealing wall is formed elastically, i.e. flexibly, and extends between a first bottom edge and a first tip edge. The second sealing wall is formed elastically, i.e. flexibly, and extends between a second bottom edge and a second tip edge. The second sealing wall further extends convergent with respect to the first sealing wall, so that the first and second sealing walls are joined together at their first and second tip edges to form a tip line. This tip line does not necessarily need to be pointed but might also be rounded or blunt. The bottom element connects the first bottom edge to the second bottom edge. The bottom element is joined to both the first sealing wall and the second sealing wall. The plurality of stiffening elements connects the first sealing wall to the second sealing wall between the tip line and the bottom element. The stiffening elements are spaced apart from one another and joined to both the first sealing wall and the second sealing wall.

Such an aerodynamic sealing is capable of adjusting its shape to the geometry of a gap, such that the gap can be tightly sealed, even when the geometry of the gap is altered, e.g. by a flap moving in the retracted position or in intermediate positions. As soon as the flap contacts and deforms the outer surface of the aerodynamic sealing, the sealing adapts to the contour of the flap, such that a) the gap is reliably sealed and b) aerodynamic sealing does not project from the gap but instead forms a smooth transition of the aerodynamic outer surfaces on both sides of the gap. In particular, as soon as the flap contacts and deforms the first or second sealing wall, the tip line bends in the direction from which the deformation is applied, i.e. the first and second sealing walls bend in such a way that the tip line considerably changes its direction and points in the direction of the contacting flap, wrapping around said flap.

According to a preferred embodiment, the stiffening elements are formed elastically. This helps the aerodynamic sealing adapting its shape to the geometry of a gap.

According to another preferred embodiment, the stiffening elements are formed rigidly. Particularly for this case, it is preferred that the stiffening elements are pivotably joined to the first sealing wall and to the second sealing wall. This helps the aerodynamic sealing adapting its shape to the geometry of a gap, in particular, causes the tip line to bend, i.e. causes the first and second sealing walls to bend in such a way that the tip line considerably changes the direction in which it points.

According to yet another preferred embodiment, the first sealing wall and/or the second sealing wall are formed planar. This enables a simple construction and helps the aerodynamic sealing adapting its shape to the geometry of a gap.

According to yet another preferred embodiment, the bottom element is formed rigid and/or planar. In such a way, the aerodynamic sealing can be mounted by the bottom element to a structure next to the gap.

According to yet another preferred embodiment, the tip line has a straight course, preferably in parallel to the bottom element. This enables a simple construction and helps the aerodynamic sealing adapting its shape to the geometry of a gap.

According to yet another preferred embodiment, the stiffening elements extend straight and preferably in parallel to one another. Further, it is preferred that all stiffening elements are spaced apart from one another by the same distance. This enables a simple construction and helps the aerodynamic sealing adapting its shape to the geometry of a gap.

According to yet another preferred embodiment, the first and second sealing walls are fixedly joined together at the tip line. Preferably, the bottom element is fixedly joined to the first sealing wall and to the second sealing wall. This enables a strong construction and helps the aerodynamic sealing adapting its shape to the geometry of a gap.

According to yet another preferred embodiment, the first and second sealing walls, the bottom element and the stiffening elements extend in a depth direction and preferably have a constant cross section along the depth direction. In such a way, a simple aerodynamic sealing is provided that can have large dimensions in the depth direction. In the case of an aerodynamic sealing mounted in a gap between a main wing of an aircraft and a flap movably mounted to the main wing, the aerodynamic sealing is preferably arranged such that the depth direction extends in parallel to a wing span direction.

Preferably, the stiffness could be varied over the various sections and elements of the aerodynamic sealing in order to adjust its deformation behavior. For example, the first sealing wall could have a different stiffness as the second sealing wall or as the stiffening elements. Also, the stiffness of the aerodynamic sealing might vary along the depth direction.

A further aspect of the present invention relates to a wing for an aircraft. The wing comprises a main wing and a Krueger flap. The Krueger flap has a first flap edge and an opposite second flap edge. The first flap edge is pivotably mounted to the main wing, such that the Krueger flap is pivotable relative to the main wing between an extended position and a stowed position. In the extended position the second flap edge forms an extension of a leading edge of the main wing, and in the stowed position the second flap edge rests against a lower side of the main wing. The wing further comprises an aerodynamic sealing according to any of afore-described embodiments. The aerodynamic sealing is mounted to the lower side of the main wing such that the second flap edge in the stowed position contacts and deforms the aerodynamic sealing in order to seal a gap between the lower side of the main wing and the second flap edge of the Krueger flap.

In such a way, the gap between the lower side of the main wing and the second edge of the Krueger flap can be reliably sealed in the stowed position of the flap. All features, embodiments, effects and advantages mentioned above in connection with the aerodynamic sealing also apply for the present wing.

According to a preferred embodiment, the lower side of the main wing comprises a recess adapted to receive the second flap edge of the Krueger flap in the stowed position. The aerodynamic sealing is arranged in the recess, preferably such that the bottom element is mounted to a first recess wall, the second sealing wall rests against a second recess wall, the tip line points to the ambient below the lower side of the main wing, and the first sealing wall is contacted and deformed by the second flap edge of the Krueger flap. In such a way, in the stowed position the deformed aerodynamic sealing may form a smooth transition between the lower side of the main wing and the Krueger flap.

Yet a further aspect of the present invention relates to a wing for an aircraft. The wing comprises a main wing and a trailing edge flap. The trailing edge flap is mounted to the trailing edge of the main wing movably between a retracted position and an extended position. A gap is formed between a leading edge of the trailing edge flap and a lower panel of the main wing. The wing further comprises an aerodynamic sealing according to any of the afore-described embodiments. The aerodynamic sealing is mounted to the main wing inside the gap, such that in the extended position of the trailing edge flap a passage is left open for air to pass between the aerodynamic sealing and the leading edge of the trailing edge flap, while in the retracted position the leading edge of the trailing edge flap contacts and deforms the aerodynamic sealing in order to seal the gap between the leading edge of the trailing edge flap and the lower panel of the main wing. It is clear that the retracted position referred to here not only stands for a fully retracted position but is also used exemplarily for any not fully extended intermediate position where the gap is to be sealed.

In such a way, the gap between the leading edge of the trailing edge flap and the lower panel of the main wing can be reliably sealed in the retracted position of the flap. All features, embodiments, effects and advantages mentioned above in connection with the aerodynamic sealing also apply for the present wing.

According to a preferred embodiment, the aerodynamic sealing is arranged inside the gap in such a way that the bottom element is mounted to an inner side of the lower panel of the main wing such that the tip line points to an inside of the main wing. Further, the aerodynamic sealing is arranged inside the gap in such a way that in the retracted position the second sealing wall is contacted and deformed by the leading edge of the trailing edge flap. In such a way, in the retracted position the deformed aerodynamic sealing may tightly adapt to the leading edge of the trailing edge flap and reliably seal the gap.

In particular, it is preferred that the aerodynamic sealing comprises an elastic blade seal extending as an extension of the bottom element beyond the second sealing wall in the direction of the leading edge of the trailing edge flap to further minimize the gap. In such a way, an additional sealing is obtained that even more reliably seals the gap.

BRIEF DESCRIPTION OF THE DRAWINGS

Hereinafter, embodiments of the present invention are described in more detail by reference to a drawing. The drawing shows in FIG. 1 a schematic cross sectional view of an aerodynamic sealing according to a first aspect of the present invention, FIGS. 2a-2c schematic detail views of a wing according to a second aspect of the present invention, showing the Krueger flap moving to the stowed position, FIGS. 3a-3b schematic detail views of a first embodiment of a wing according to a third aspect of the present invention, showing the trailing edge flap moving to the retracted position, and FIGS. 4a-4b schematic detail views of a second embodiment of the wing according to the third aspect of the present invention, showing the trailing edge flap in a partly extended position.

DETAILED DESCRIPTION

Figure 1:
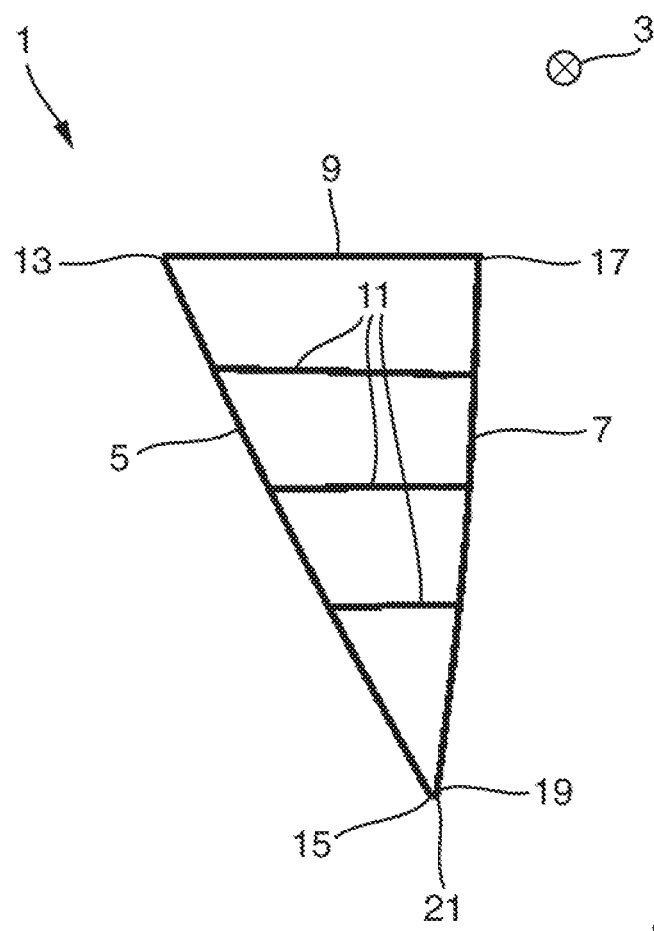

In FIG. 1, an embodiment of an aerodynamic sealing 1 is shown in a cross sectional view, wherein the cross section extends across a depth direction 3 of the aerodynamic sealing.

The aerodynamic sealing 1 comprises a first sealing wall 5, a second sealing wall 7, a bottom element 9, and a plurality of stiffening elements 11.

The first sealing wall 5 is formed planar and elastically, and extends between a first bottom edge 13 and a first tip edge 15. The second sealing wall 7 is formed planar and elastically, and extends between a second bottom edge 17 and a second tip edge 19. The second sealing wall 7 further extends convergent with respect to the first sealing wall 5, so that the first and second sealing walls 5, 7 are fixedly joined together at their first and second tip edges 15, 19 to form a tip line 21. The tip line 21 has a straight course in parallel to the bottom element 9.

The bottom element 9 is formed rigid and planar, and connects the first bottom edge 13 to the second bottom edge 17. The bottom element 9 is fixedly joined to both the first sealing wall 5 and the second sealing wall 7.

The plurality of stiffening elements 11 connects the first sealing wall 5 to the second sealing wall 7 between the tip line 21 and the bottom element 9. The stiffening elements 11 are straight and parallelly spaced apart from one another by the same distance. The stiffening elements 11 are joined to both the first sealing wall 5 and the second sealing wall 7. The stiffening elements 11 are formed elastically. However, the stiffening elements 11 might also be formed rigidly and be pivotably joined to the first sealing wall 5 and to the second sealing wall 7.

The aerodynamic sealing 1, i.e. first and second sealing walls 5, 7, the bottom element 9 and the stiffening elements 11, extend in the depth direction 3 and have a constant cross section along the depth direction 3.

Figure 2A:
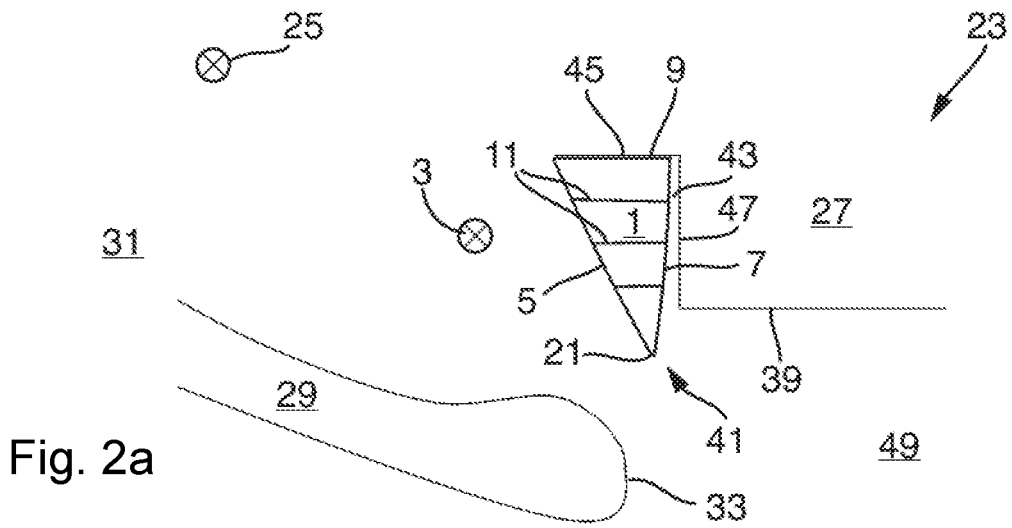
Figure 2B:
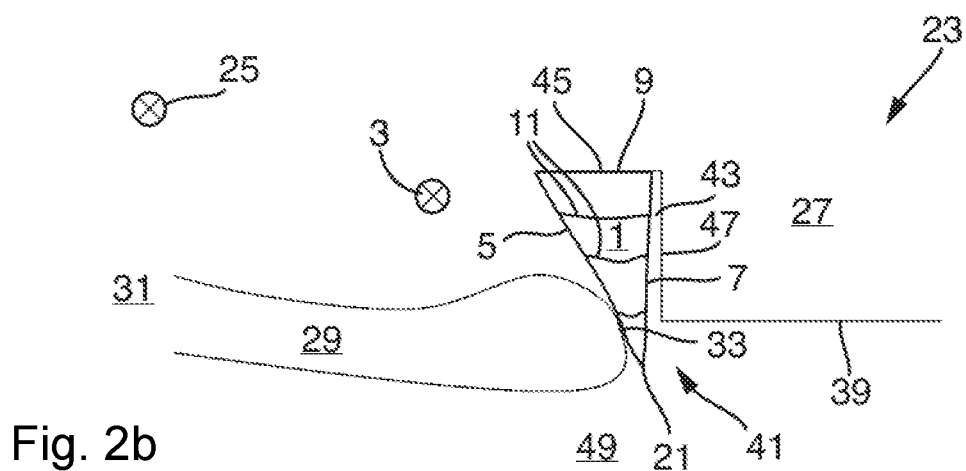
Figure 2C:
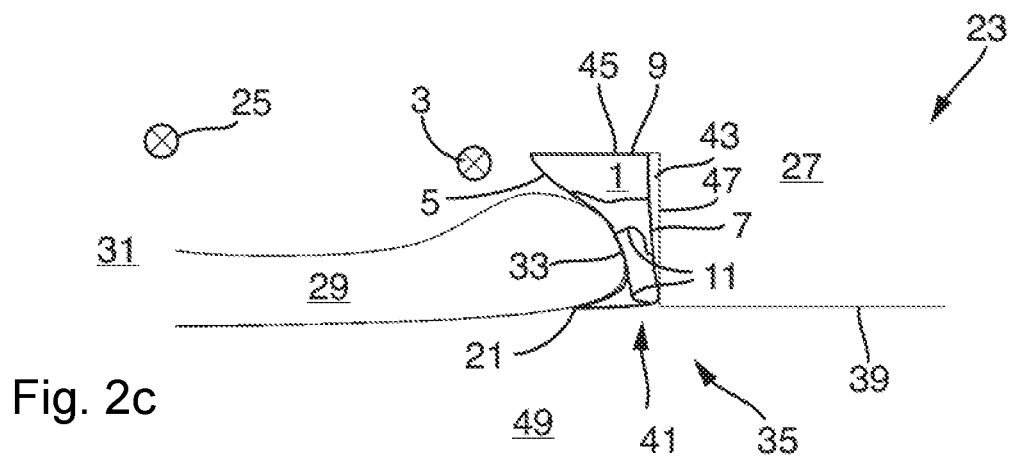

In FIG. 2, an embodiment of a wing 23 for an aircraft is shown in a cross sectional view, wherein the cross section extends across a wing span direction 25 of the wing.

The wing 23 comprises a main wing 27 and a Krueger flap 29. The Krueger flap 29 has a first flap edge 31 and an opposite second flap edge 33. The first flap edge 31 is pivotably mounted to the main wing 27, such that the Krueger flap 29 is pivotable relative to the main wing 27 between an extended position (not shown) and a stowed position 35. In the extended position the second flap edge 33 forms an extension of a leading edge (not shown) of the main wing 27, and in the stowed position 35 the second flap edge 33 rests against a lower side 39 of the main wing 27. The wing 23 further comprises an aerodynamic sealing 1 as described in connection with FIG. 1. The aerodynamic sealing 1 is arranged such that its depth direction 3 is parallel to the wing span direction 25. The aerodynamic sealing 1 is mounted to the lower side 39 of the main wing 27 such that the second flap edge 33 in the stowed position 35 contacts and deforms the aerodynamic sealing 1 in order to seal a gap 41 between the lower side 39 of the main wing 27 and the second flap edge 33 of the Krueger flap 29.

The lower side 39 of the main wing 27 comprises a recess 43 adapted to receive the second flap edge 33 of the Krueger flap 29 in the stowed position 35. The aerodynamic sealing 1 is arranged in the recess 43, such that the bottom element 9 is mounted to a first recess wall 45, the second sealing wall 7 rests against a second recess wall 47, the tip line 21 points to an ambient 49 below the lower side 39 of the main wing 27, and the first sealing wall 5 is contacted and deformed by the second flap edge 33 of the Krueger flap 29.

FIG. 2 shows in steps a), b) and c) how the Krueger flap 29 is moved to a stowed position 35. The Krueger flap 29 is moved from a partly extended position (step a), where the Krueger flap 29 does not contact the aerodynamic sealing 1, to an almost stowed position (step b), where the second flap edge 33 of the Krueger flap 29 contacts the aerodynamic sealing 1, and finally to a stowed position 35 (step c), where the second flap edge 33 of the Krueger flap 29 deforms the aerodynamic sealing 1.

Figure 3A:
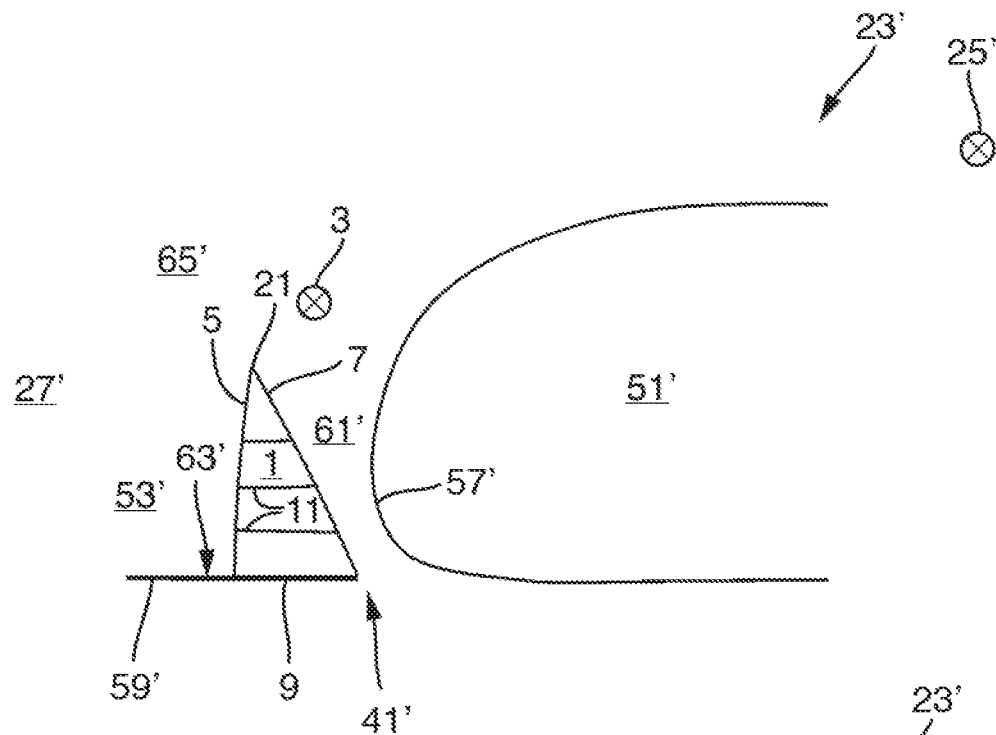
Figure 3B:
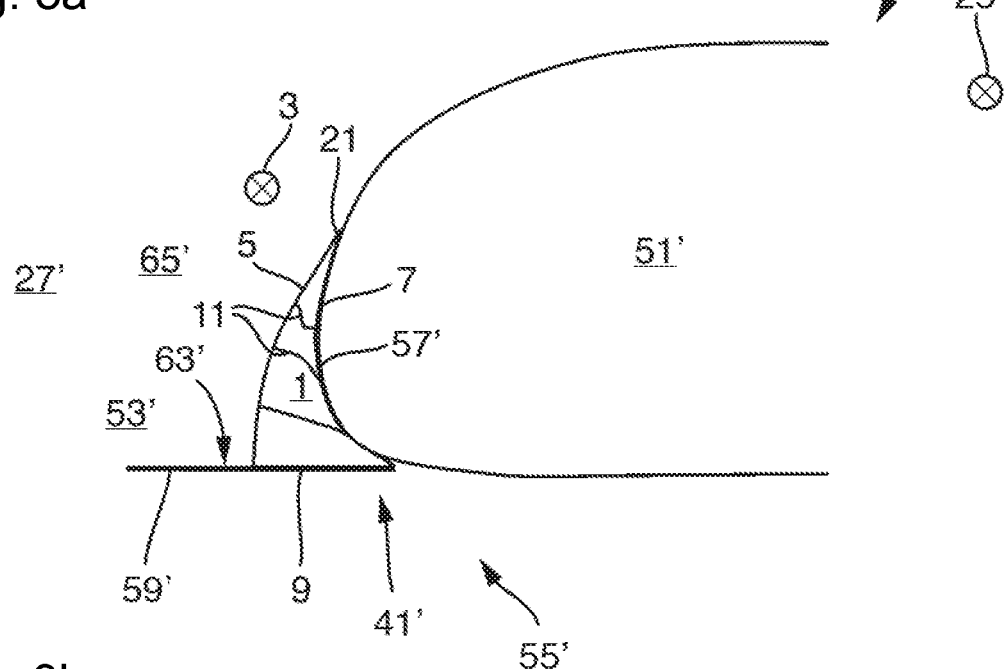

In FIG. 3, an embodiment of another wing 23' for an aircraft is shown in a cross sectional view, wherein the cross section extends across a wing span direction 25' of the wing 23'.

The wing 23' comprises a main wing 27' and a trailing edge flap 51'. The trailing edge flap 51' is mounted to a trailing edge 53' of the main wing 27' movably between a retracted position 55' and an extended position (not shown). A gap 41' is formed between a leading edge 57' of the trailing edge flap 51' and a lower panel 59' of the main wing 27'. The wing 23' further comprises an aerodynamic sealing 1 as described in connection with FIG. 1. The aerodynamic sealing 1 is arranged such that its depth direction 3 is parallel to the wing span direction 25'. The aerodynamic sealing 1 is mounted to the main wing 27' inside the gap 41', such that in the extended position of the trailing edge flap 51' a passage 61' is left open for air to pass between the aerodynamic sealing 1 and the leading edge 57' of the trailing edge flap 51', while in the retracted position 55' the leading edge 57' of the trailing edge flap 51' contacts and deforms the aerodynamic sealing 1 in order to seal the gap 41' between the leading edge 57' of the trailing edge flap 51' and the lower panel 59' of the main wing 27'.

The aerodynamic sealing 1' is arranged inside the gap 41' in such a way that the bottom element 9 is mounted to an inner side 63' of the lower panel 59' of the main wing 27' such that the tip line 21 points to an inside 65' of the main wing 27'. Further, the aerodynamic sealing 1 is arranged inside the gap 41' in such a way that in the retracted position 55' the second sealing wall 7 is contacted and deformed by the leading edge 57' of the trailing edge flap 51'.

FIG. 3 shows in steps a) and b) how the trailing edge flap 51' is moved to a retracted position 55'. The trailing edge flap 51' is moved from a partly extended position (step a), where the trailing edge flap 51' does not contact the aerodynamic sealing 1, to a retracted position 55' (step b), where the leading edge 57' of the trailing edge flap 51' contacts and deforms the aerodynamic sealing 1.

Figure 4A:
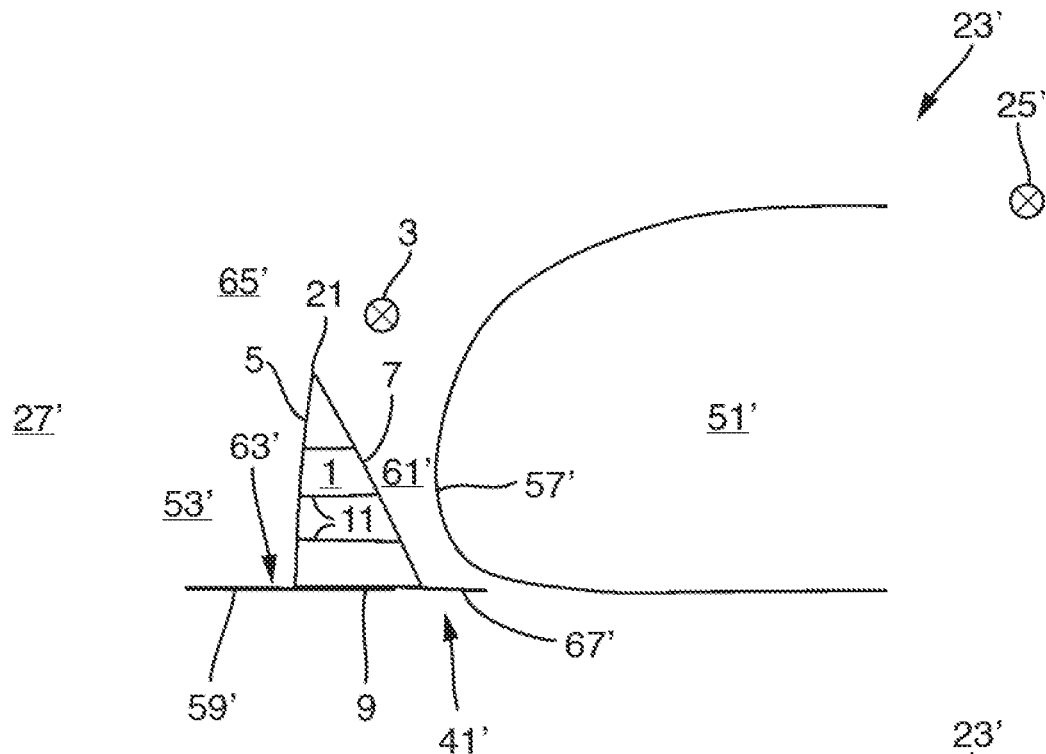
Figure 4B:
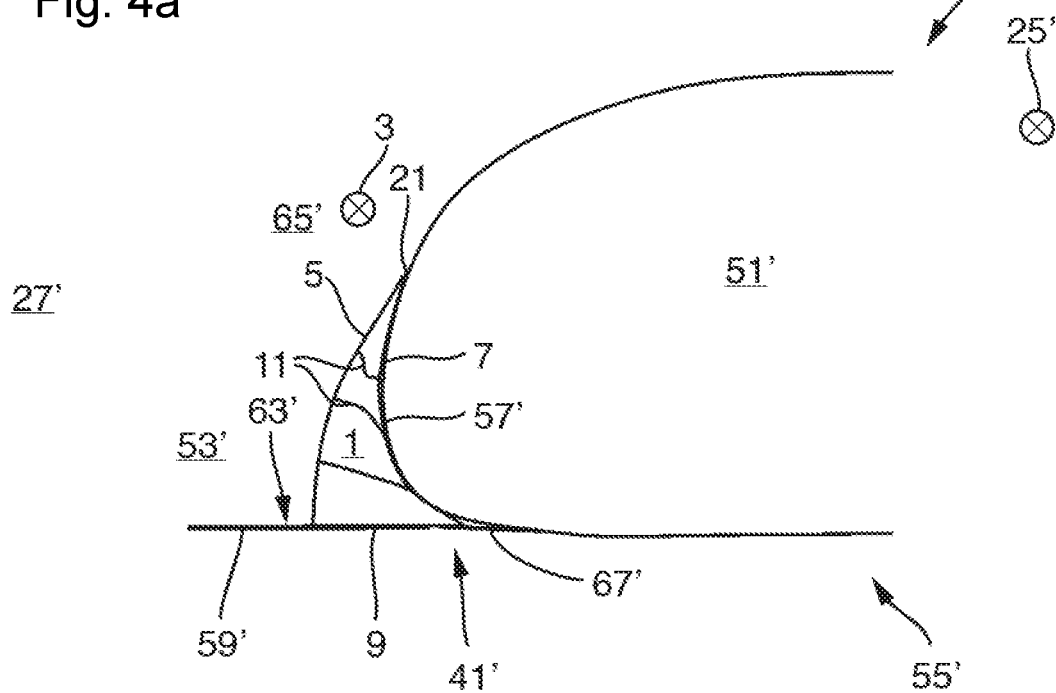

In FIG. 4, another embodiment of the wing 23' of FIG. 3 is shown in a cross sectional view, wherein the cross section extends across a wing span direction 25' of the wing 23'. The wing 23' is shown in a partly extended position of the trailing edge flap 51' in step a), and in a retracted position 55' of the trailing edge flap 51' in step b). The embodiment of FIG. 4 differs from the embodiment of FIG. 3 only by the aerodynamic sealing 1 comprising an elastic blade seal 67' extending as an extension of the bottom element 9 beyond the second sealing wall 7 in the direction of the leading edge 57' of the trailing edge flap 51' to further seal and minimize the gap 41'.

The invention claimed is:

1. A wing for an aircraft, comprising:
   a main wing; and
   a Krueger flap having a first flap edge and an opposite second flap edge,
   wherein the first flap edge is pivotably mounted to the main wing, such that the Krueger flap is pivotable relative to the main wing between an extended position and a stowed position,
   wherein in the extended position the second flap edge forms an extension of a leading edge of the main wing, and in the stowed position the second flap edge rests against a lower side of the main wing,
   wherein the wing further comprises an aerodynamic sealing comprises:
      an elastic first sealing wall extending between a first bottom edge and a first tip edge;
      an elastic second sealing wall extending between a second bottom edge and a second tip edge, and extending convergent with respect to the first sealing wall, so that the first and second sealing walls are joined together at their first and second tip edges to form a tip line;
      a bottom element connecting the first bottom edge to the second bottom edge, wherein the bottom element is joined to both the first sealing wall and the second sealing wall; and
      a plurality of stiffening elements connecting the first sealing wall to the second sealing wall between the tip line and the bottom element, wherein the stiffening elements are spaced apart from one another and joined to both the first sealing wall and the second sealing wall, and
   wherein the aerodynamic sealing is mounted to the lower side of the main wing such that the second flap edge in the stowed position contacts and deforms the aerodynamic sealing to seal a gap between the lower side of the main wing and the second flap edge of the Krueger flap.

2. The wing according to claim 1, wherein the stiffening elements are formed elastically.

3. The wing according to claim 1, wherein the stiffening elements are formed rigidly.

4. The wing according to claim 1, wherein the stiffening elements are pivotably joined to the first sealing wall and to the second sealing wall.

5. The wing according to claim 1, wherein the first sealing wall or the second sealing wall are formed planar.

6. The wing according to claim 1, wherein the bottom element is formed rigid or planar.

7. The wing according to claim 1, wherein the tip line has a straight course in parallel to the bottom element.

8. The wing according to claim 1, wherein the stiffening elements extend straight and in parallel to one another.

9. The wing according to claim 1, wherein the first and second sealing walls are fixedly joined together at the tip line, and wherein the bottom element is fixedly joined to the first sealing wall and to the second sealing wall.

10. The wing according to claim 1, wherein the first and second sealing walls, the bottom element and the stiffening elements extend in a depth direction and have a constant cross section along the depth direction.

11. The wing according to claim 1, wherein the lower side of the main wing comprises a recess adapted to receive the second flap edge of the Krueger flap in the stowed position, and
   wherein the aerodynamic sealing is arranged in the recess, such that the bottom element is mounted to a first recess wall, the second sealing wall rests against a second recess wall, the tip line points to an ambient, and the first sealing wall is contacted and deformed by the second flap edge of the Krueger flap.

12. A wing for an aircraft, comprising:
   a main wing; and
   a trailing edge flap mounted to a trailing edge of the main wing movably between a retracted position and an extended position,
   wherein a gap is formed between a leading edge of the trailing edge flap and a lower panel of the main wing,
   wherein the wing further comprises an aerodynamic sealing comprises:
      an elastic first sealing wall extending between a first bottom edge and a first tip edge;
      an elastic second sealing wall extending between a second bottom edge and a second tip edge, and extending convergent with respect to the first sealing wall, so that the first and second sealing walls are joined together at their first and second tip edges to form a tip line;
      a bottom element connecting the first bottom edge to the second bottom edge, wherein the bottom element is joined to both the first sealing wall and the second sealing wall; and
      a plurality of stiffening elements connecting the first sealing wall to the second sealing wall between the tip line and the bottom element, wherein the stiffening elements are spaced apart from one another and joined to both the first sealing wall and the second sealing wall, and
   wherein the aerodynamic sealing is mounted to the main wing inside the gap, such that in the extended position of the trailing edge flap a passage is left open between the aerodynamic sealing and the leading edge of the trailing edge flap, while in the retracted position the leading edge of the trailing edge flap contacts and deforms the aerodynamic sealing.

13. The wing according to claim 12, wherein the aerodynamic sealing is arranged inside the gap in such a way that the bottom element is mounted to an inner side of the lower panel of the main wing such that the tip line points to an inside of the main wing, and in such a way that in the retracted position the second sealing wall is contacted and deformed by the leading edge of the trailing edge flap.

14. The wing according to claim 13, wherein the aerodynamic sealing comprises an elastic blade seal extending as an extension of the bottom element beyond the second sealing wall in the direction of the leading edge of the trailing edge flap to further minimize the gap.

\* \* \* \* \*